Oct. 16, 1956   C. C. GALLAGHER   2,766,547
FISHHOOK LEADER
Filed Feb. 23, 1954
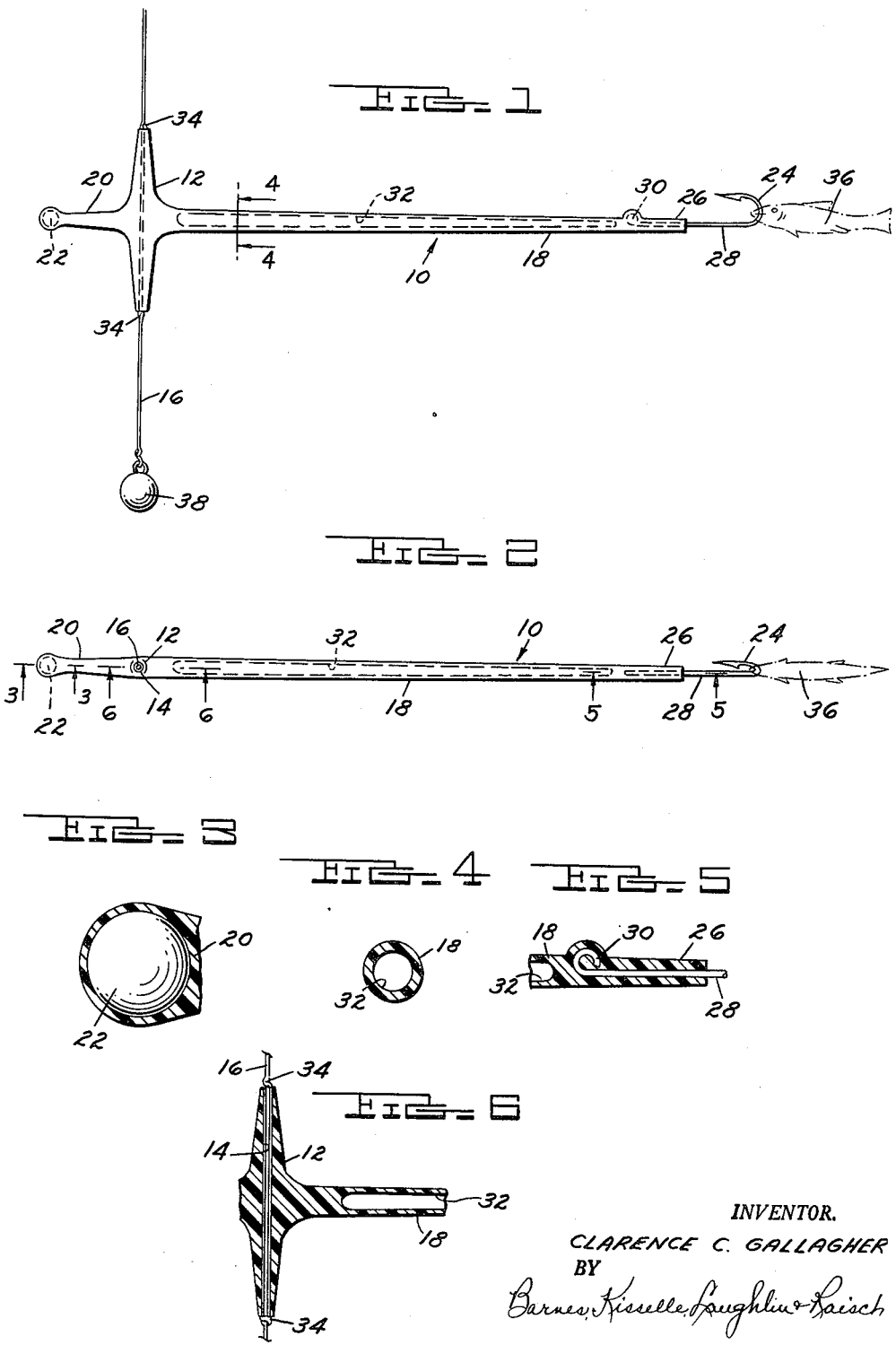
INVENTOR.
CLARENCE C. GALLAGHER
BY
Barnes, Kisselle, Laughlin & Raisch
ATTORNEYS 2,766,547

FISHHOOK LEADER

Clarence C. Gallagher, Detroit, Mich.

Application February 23, 1954, Serial No. 411,756

4 Claims. (Cl. 43—42.74)

This invention relates to a fish hook leader of the type which holds bait in a horizontal position.

It is desirable to hold a fish hook and bait such as a minnow in a generally horizontal position spaced from the fish line to present a natural appearing and easily taken lure and to prevent the hook and bait from becoming fouled with the fish line. Prior devices have accomplished this by means of relatively complicated bridles held in operative position by tension in the fish line maintained by the use of sinkers. An object of this invention is to provide a simple and inexpensive horizontal type leader structure which is effective with or without a sinker. One form of the invention is shown in the accompanying drawings.

Fig. 1 is a generally elevational view of the device of this invention in use.

Fig. 2 is a plan view thereof.

Fig. 3 is an enlarged section on line 3—3 of Fig. 2.

Fig. 4 is an enlarged section on line 4—4 of Fig. 1.

Fig. 5 is an enlarged section on line 5—5 of Fig. 2.

Fig. 6 is an enlarged central sectional view of a part of the base and an adjacent portion of the device.

The leader 10 shown in the drawings is preferably a single piece unit having a base 12 with an axial passageway 14 through which a fish line 16 extends. Projecting in opposite directions from the base are an elongate arm 18 and a counterbalance element 20 which carries a counterbalance weight such as a shot 22. The leader is preferably made of a lightweight, tough, somewhat flexible and preferably transparent material such as a vinyl plastic. Arm 18 is preferably tapered as shown in Fig. 1 for flexibility.

A standard type fish hook 24 is fixed on the end portion 26 of arm 18 distal of base 12 with shank 28 of the hook in longitudinal extension of the arm preferably by imbedding the eye 30 and a portion of shank 28 in the material forming the arm. Arm 18 has hollow tubular form providing a sealed air cell 32 extending substantially from base 12 to distal end 26 of the arm.

In use, fish line 16 is threaded through passageway 14 in base 12 and leader 10 is secured in position on the line by knots 34 at each end of the base. Bait such as a minnow 36 is fastened on hook 24 and a sinker 38 may be secured on the line. When submerged in water, arm 18 tends to be buoyant because of air cell 32 therein and the weight of hook 24 and bait 36 are counterbalanced by weight 22 on element 20. The leader thus supports the bait in the desired natural horizontal swimming position and spaces hook and line from each other to reduce the danger of their becoming entangled and to reduce the possibility of fish being frightened away from the bait by parts of the tackle. In the latter regard, the leader itself, being transparent, has relatively low visibility.

While tension in the fish line caused by sinker 38 may help to maintain the horizontal position of the leader, the leader tends to remain generally horizontal even where the sinker rests upon the bottom or is not used. The relatively loose connection between fish line 16 and leader 10 provided by knots 34 at the ends of base 12 allows the leader to swivel around the fish line with currents in the water and with swimming of the bait if live bait is used.

I claim:

1. A fish hook leader for holding bait generally horizontally at a location spaced from a fish line comprising, a single element having a base with two generally oppositely extending projections disposed generally perpendicularly thereto, said base including a passageway adapted to have a fish line passed therethrough, one of said projections being elongate and having means at its distal end for longitudinally receiving the shank of a fish hook, said one projection being of hollow tubular form intermediate said base and said distal end to provide air cell means for buoyant support of said projection, the other projection carrying a weight for counterbalancing said one projection, whereby to support a hook and bait thereon in a generally horizontal position when submerged in water.

2. The combination of a fish hook leader of the type defined in claim 1 and a fish hook, wherein a portion of the shank of said hook is imbedded in said material forming said element with said shank disposed so that generally the longitudinal axis thereof coincides with an extension of the longitudinal axis of said tubular air cell.

3. A fish hook leader for supporting a fish hook in a generally horizontal position when submerged in water comprising, a base adapted to be secured to a fish line, a generally rigid projection secured at a generally right angle to said base, means at the distal end of said projection for longitudinally receiving the shank of a fish hook and air cell means in said projection for buoyantly supporting the same.

4. A fish hook leader for supporting a fish hook in a generally horizontal position when submerged in water comprising, a base adapted to be secured to a fish line, a generally rigid bait projection of plastic material secured at a generally right angle to said base, a fish hook secured to the free end of said bait projection with its shank extending generally longitudinally of said bait projection, said shank being relatively short with respect to the length of said bait projection, a counter-balance projection on said base projecting generally oppositely from said bait projection, said counter-balance arm being relatively short with respect to the length of said bait projection and a weight at the distal end of said counter-balance projection for counter-balancing said bait arm.

References Cited in the file of this patent

UNITED STATES PATENTS

| 1,846,538 | Albers et al. | Feb. 23, 1932 |
| 2,085,320 | Kolstrand | June 29, 1937 |
| 2,145,992 | Parker | Feb. 7, 1939 |
| 2,231,616 | Costantino | Feb. 11, 1941 |
| 2,551,998 | De Grott | May 8, 1951 |
| 2,556,634 | Redinger | June 12, 1951 |
| 2,592,664 | De Mello | Apr. 15, 1952 |